United States Patent [19]
Williams

[11] 3,745,689
[45] July 17, 1973

[54] ICE FISHING BOX
[76] Inventor: Orris Williams, Rt. 1, Friendship, Wis. 53934
[22] Filed: Nov. 15, 1971
[21] Appl. No.: 198,713

[52] U.S. Cl. ................................................. 43/17
[51] Int. Cl. ............................................ A01k 97/12
[58] Field of Search ................................. 43/17, 16

[56] References Cited
UNITED STATES PATENTS

| | | | |
|---|---|---|---|
| 188,503 | 3/1877 | Davis | 43/17 |
| 1,253,746 | 1/1918 | Teeling | 43/17 |
| 2,618,091 | 11/1952 | Sheraski | 43/17 |
| 3,423,867 | 1/1969 | Bartletti | 43/17 |

*Primary Examiner*—Louis G. Mancene
*Assistant Examiner*—Daniel J. Leach
*Attorney*—Laforest S. Saulsbury et al.

[57] ABSTRACT

An ice fishing box has been provided in which a spring signal strip can be released from the box in response to the turning movement of a fish line reel rod that has a vertical retaining plate for the end of the spring strip to hold it on the pin projection on the side wall of the box. At the opposite end of the fish reel rod is a crank. This rod is journaled in the opposite sides of the box wall. This same spring signal strip is anchored to the opposite side of the box and by means of a latch plate adapted to be extended across the end of the spring strip on the latched end of the spring strip with a pin projection, can be held in place in the form of a bail by which the box can be carried from one location to another. A transparent cover is provided on the top of the box formed of glass or plastic hingedly connected to the rear side and has a handle on the front side. The reel on being turned by the crank, can bring the fish up to the opening and under the cover so that upon lifting the cover the fish can be taken from the ice box away from the ice hole for the purpose of freeing the fish from the line hook.

6 Claims, 7 Drawing Figures

PATENTED JUL 17 1973 3,745,689
INVENTOR.
Orris Williams
BY Laforest S. Saulsbury
ATTORNEY
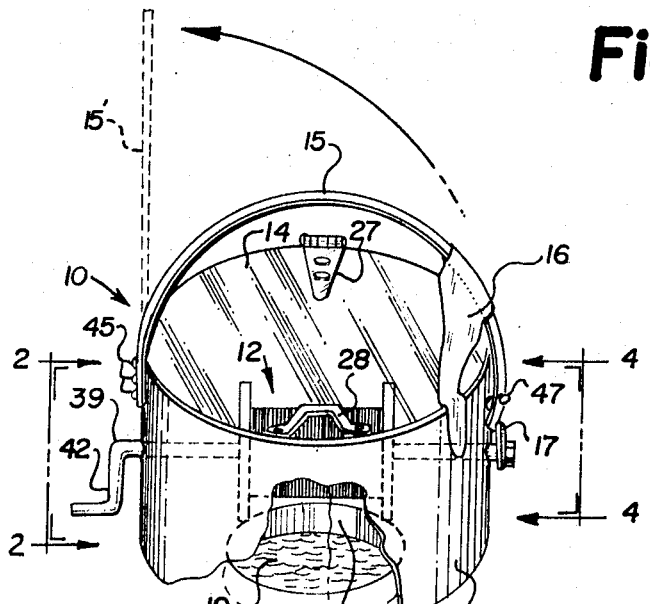
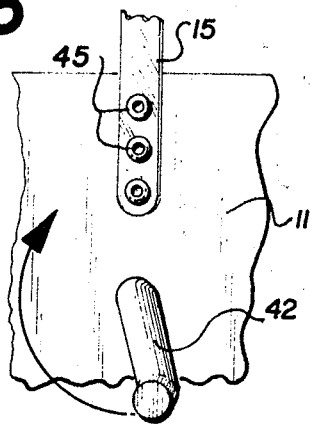
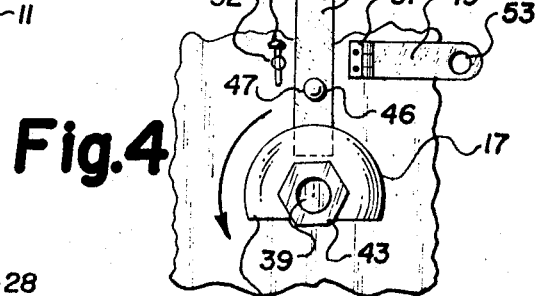
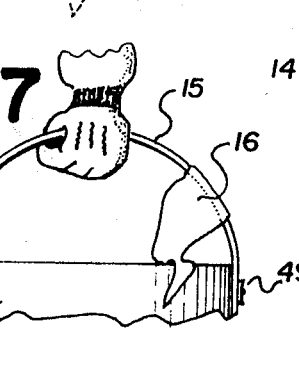
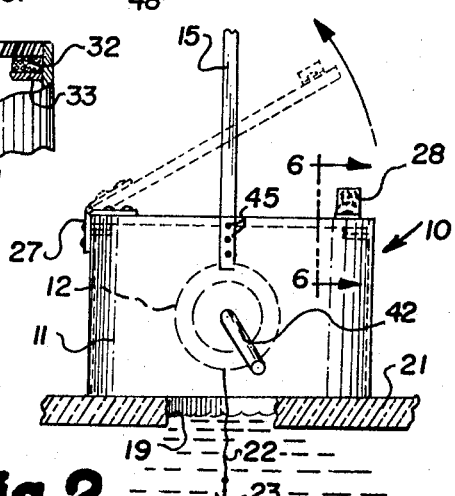
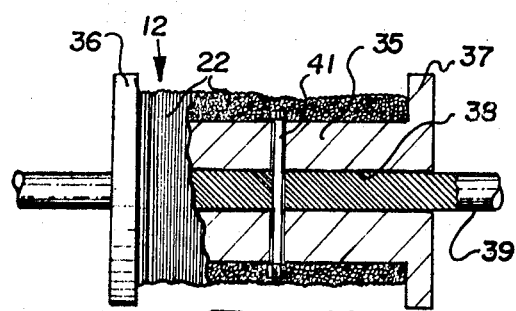

ICE FISHING BOX

This invention relates to an ice fishing box.

It is an object of the present invention to provide a simple flag signal device incorporating a spring strip that can be easily and readily attached to the side of the box and held in place by means of a stop plate forming part of the fishing reel rod which is cut away to release the ends of the spring strip upon the fish pulling on the line and turning the reel.

It is another object of the invention to provide an ice fishing box in which the fish can be removed from the box free of the hole and a cover on the box which when the box is positioned over the hole will prevent the return of the fish into the water through the hole upon the fisherman attempting to sever the fish from the line.

It is still a further object of the invention to provide an ice fishing box with a spring strip signal member that can be used as a bail for the carrying of the ice fishing box from one location to another with means being provided for the holding of the end of the spring strip upon a pin projection independently of the reel rod stop plate; a latch member hinged to the fishing box at one side of the spring strip can be pivoted across the strip to engage a pin projection on the opposite side of the strip and be held thereon by a cotter pin extending through the pin projection.

Other objects of this invention are to provide an ice fishing box having the above objects in mind, which is of simple construction, inexpensive to manufacture, has a minimum number of parts, easy to effect the attachment of the free end of the spring strip and to set the ice fishing box for use, of pleasing appearance, light in weight, efficient in operation, and effective in use.

For a better understanding of the invention, reference may be had to the following detailed description taken in connection with the accompanying drawings, in which:

FIG. 1 is a top and front perspective view of the ice fishing box embodying the features of the present invention with a portion broken away to show the hole in the ice through which the fish line is extended.

FIG. 2 is a side elevational view of the ice fishing box resting upon the ice and showing the hole broken away, the view being taken on line 2—2 of FIG. 1 and looking in the direction of the arrows thereof.

FIG. 3 is an enlarged fragmentary elevational view taken on the same line 2—2 of FIG. 1 and looking upon the attached end of the spring signal strip and upon the crank extended through the box wall.

FIG. 4 is an enlarged fragmentary elevational view of the spring signal strip latched to a stop on the fish line winding reel rod and as viewed generally on line 4—4 of FIG. 1 and looking in the direction of the arrows thereof.

FIG. 5 is an enlarged elevational view of the fish line reel with portions broken away and shown in section, the reel being removed from the ice box wall.

FIG. 6 is a fragmentary sectional view of the ice box and its hinged top as viewed on line 6—6 of FIG. 2 with portions of the box being broken away and the handle of the cover being shown in full.

FIG. 7 is a fragmentary elevational view of the spring signal strip locked to the opposite side of the box by a latch to permit the spring strap to serve as means for carrying the ice fishing box from one location to another.

Referring now to the figures, 10 represents the ice fishing box in its entirety and which comprises generally a cylindrical shaped wall 11, a fishing reel assembly 12 lying within the wall carried on a reel shaft 39 extending externally through the opposite sides of the wall, a top transparent cover of glass or plastic as indicated at 14 and a spring signal strip 15 bowed across the top of the box when in use position and free to be extended upwardly to dotted line position shown in FIG. 1 with its signal flag 16 when the signal strip has been released by a pull upon the fish line by the fish and the free end of the spring signal strip released from a half-circular stop plate 17 on the crank reel rod 13.

The cylindrical wall 11 may be about 18 inches in diameter and has a lower edge 18 which can rest on the ice surface about a hole 19 that has been cut into ice 21 and aligned with the reel 12 so that fish line 22 can be lowered through the hole into the ice to render a hook 23 and bait 24 accessible to a fish 25.

Cover 14 is transparent and of circular shape, formed either of glass or transparent plastic and is hinged by a door hinge 27 connected to the rear edge of the box 11 and to the opposite side of which is connected a loop hand grip or handle 28 secured by fastening screws 29 and 31 to the opposite edge of the cover 14 and at the front thereof. The cover when closed is lowered onto a washer or annular ring 32 made of a substance to which the glass will not readily adhere and will not absorb water that could freeze to the underface of the cover. This annular member 32 is supported on inwardly extending annular projection 33 fastened by its outer periphery to the inner face of the box wall, FIG. 6. A complete view of the top of the reel 12 can be observed at all times and by lifting the cover a fish can be removed from the hook 23 on the fish line 22 passed the reel 12 without disturbing the ice box. The fish on the line can be taken through the ice fishing box open top to outside thereof, and the hook 23 baited for another fishing operation.

The reel 12 is in the form of a spool having an intermediate portion 35 onto which the line 22 is reeled and on the ends of which are spool flanges 36 and 37 to confine the line 22 to the intermediate portion 35. The spool has a central hole 38 through which spool reel rod 39 extends. The spool intermediate portion 35 is fixed to the crank reel rod 39 by a central pin 41 extending through the intermediate portion 35 of the spool and diametrically through the rod 39 as best seen in FIG. 5.

One end of the rod 39 has a hand crank portion 42 to turn the reel assembly 12 with the line and to pull inwardly the line from the water through an ice hole 19.

The opposite end of the reel rod 39 carries the stop plate 17 of semi-circular shape and made secure to the end of the rod by a nut 43 in such a manner as to be rigid with the end of the rod 39 and to turn with the rod.

The spring signal strip 15 is anchored to one side of the box wall 11 by a series of rivets 45, FIGS. 1 and 3, and when released to flash a signal is extended to an upward position as indicated by dotted lines 15' in FIG. 1 taking with it the flag signal 16.

To set the spring signal strip 15 in place the free end of the strip 15 has a hole 46 and receives a pin 47 that extends outwardly from the box wall 11. In order to keep the spring strip in place upon the projection 47 and to keep it from springing outwardly, the reel rod 39 is turned in the direction of the arrows shown in FIG. 4 to let out the fish line 22 and when it has been extended to the desired distance or length, the curved edge of the plate 17 is brought to a position so that the outer face of the end of the strip 15 will abut the inner face of the plate 17 and thereby hold the spring strip 15 against outward displacement from the pin 47. When the fish grasps the hook 23 of line 22, the reel will turn so that the straight cut away edge 48 will free the end of the spring strip 15 so that the spring strip can release itself from the pin projection 47 and take the flag 16 to a vertical position to indicate to the fisherman that a fish is on the line.

The fish will be reeled in and by lifting the cover 14 by its handle 28 it can be taken from the box and severed from the hook 23.

Should it be desired to carry the fishing box to a new location as illustrated in FIG. 7, the spring signal strip 15 can be used as a carrying bail. A hinge member 49, hingedly secured to the outer surface of the box wall 11 as indicated at 51, is swung over a pin 52 that is projected from the wall of the box and received by a hole 53 in the latch member 49. A cotter pin 54 is then extended through the pin projection 52 to hold the latch plate 43 in place over the pin 52. In this manner, the ice box with the reel and line can be carried to a new location by gripping the spring strip 15 as illustrated in FIG. 7.

It should now be apparent that there has been provided an effective ice fishing box in which the signal flag spring strip is flexible and can be easily latched on the side of the box wall and held in place by a plate 17 carried on the rod 39 of the fish reel so that as the fish line is pulled outwardly by the fish to turn the reel, the spring strip will be released and the flag 16 displayed in a raised position thereby serving as a signal to the fisherman that there is a fish on the line or that the hook 23 may need to be re-baited with the fish having pulled the line and got away with the bait. It should also be apparent that once the fish is reeled in, it can be very readily lifted from the top of the box by merely lifting the cover so that it can be readily severed from the fish line. The lower edge of the box wall may freeze into the ice and be held rigid over the ice hole 19.

It should also be noted that the spring strip 15 can serve as a bail for the carrying of the ice fishing box from one location to another by the use of the hinge member 49 that is extended over the end of the spring strip 15 to keep the spring strip in place upon its fastening pin 47 and against the outward displacement therefrom in the same manner that when the ice fishing box is being used for a fishing operation the spring strip is held on the pin projection 47 by the stop plate 17.

While various changes may be made in the detailed construction, it shall be understood that such changes will be within the spirit and scope of the present invention as defined by the appended claims.

I claim:

1. An ice fishing box comprising a box wall structure defining openings at each of the bottom and the top, a fishing reel having a fish line thereon adapted to be extended through the bottom opening and thereafter through a hole in the ice when the box structure is placed thereover, a fish reel rod extending between the sides of the box structure and journaled therein to be turned, one end of the rod having mounted thereon a vertically extending retaining plate cutaway on one side, a signal spring strip rigidly secured to one side of the box structure and extendable thereover to the opposite side of the box to a location behind the retaining plate on the fishing reel rod when the retaining plate is turned to a retaining position, said signal spring having a hole through the end thereof and a pin projection extending outwardly from the wall and over which the spring strip is extended to hold the spring strip against upward displacement from the pin, said retaining plate holding the end of the spring strip against outward displacement from the retaining plate, said spring strip being releasable from the pin projection upon the retaining plate being turned with the fish grasping the line to turn the reel and to bring the cutaway side to a spring strip-end release position.

2. An ice fishing box as defined in claim 1, and a flag signal secured to the spring strip adjacent the free end thereof, said spring strip adapted to be extended upwardly upon being released from the pin projection to display the flag signal.

3. An ice fishing box as defined in claim 1, and a hinged latch plate hingedly connected to the box structure at one side of the free end of the spring strip above the projection receiving the spring strip, a further pin projection on the box wall at the opposite side of the spring strip for receiving the latch plate as it is extended over the spring strip whereby to keep the spring strip in engagement with its pin projection, pin means engaging the further pin projection to keep the latch plate in a latched position thereupon whereby the spring strip may be used as a bail for the carrying of the ice box from one location to another.

4. An ice fishing box as defined in claim 1, and said reel rod having a lever crank means on the opposite end of the rod, said reel including a spool, said spool being secured to the reel rod for turning movement therewith.

5. An ice fishing box as defined in claim 1, and a transparent cover extended over said top opening and a handle secured to an upper surface of the cover adapted to be gripped to lift the cover to provide access to the interior of the box and an upper portion of walls of the box wall structure having a seat-shape formation for the cover.

6. An ice fishing box as defined in claim 1, in which said spring strip is sturdy and shaped suitably for utilization as a handle when retained by said retaining plate.

* * * * *